(12) United States Patent
Castellane et al.

(10) Patent No.: US 7,247,855 B2
(45) Date of Patent: Jul. 24, 2007

(54) PORTABLE NUCLEAR DETECTOR

(75) Inventors: Raymond M. Castellane, Vicksburg, MS (US); Bartley P. Durst, Clinton, MS (US); Falih H. Ahmad, Cornelius, NC (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 577 days.

(21) Appl. No.: 10/795,363

(22) Filed: Mar. 9, 2004

(65) Prior Publication Data

US 2007/0029489 A1    Feb. 8, 2007

(51) Int. Cl.
*G01T 1/167* (2006.01)

(52) U.S. Cl. .................. 250/363.01; 250/362; 250/369

(58) Field of Classification Search .......... 250/363.01, 250/363.02, 369, 362, 339.08, 370.02, 370.07, 250/370.06, 370.09, 370.11, 281, 282, 283, 250/292

See application file for complete search history.

(56) References Cited

U.S. PATENT DOCUMENTS

| | | | | |
|---|---|---|---|---|
| 3,657,532 A | * | 4/1972 | Zimmerman | 250/362 |
| 3,790,785 A | * | 2/1974 | Paolini et al. | 250/363.01 |
| 3,937,955 A | * | 2/1976 | Comisarow et al. | 250/283 |
| 3,999,071 A | * | 12/1976 | Siffert et al. | 250/370.02 |
| 4,461,952 A | * | 7/1984 | Allemand et al. | 250/370.07 |
| 4,755,670 A | * | 7/1988 | Syka et al. | 250/292 |
| 4,866,260 A | * | 9/1989 | Lescourret | 324/76.28 |
| 5,151,598 A | * | 9/1992 | Denen | 250/336.1 |
| 5,218,208 A | * | 6/1993 | Augier et al. | 250/363.02 |
| 5,441,050 A | * | 8/1995 | Thurston et al. | 600/436 |
| 5,608,222 A | * | 3/1997 | Hardy, II | 250/369 |
| 5,692,029 A | * | 11/1997 | Husseiny et al. | 378/88 |
| 6,087,656 A | * | 7/2000 | Kimmich et al. | 250/252.1 |
| 6,242,741 B1 | * | 6/2001 | Miller et al. | 250/363.02 |
| 6,590,206 B1 | * | 7/2003 | Evrard | 250/293 |
| 6,624,411 B2 | * | 9/2003 | Umemura | 250/292 |
| 6,878,931 B1 | * | 4/2005 | Roushall et al. | 250/287 |
| 6,984,820 B2 | * | 1/2006 | Davis | 250/291 |
| 2004/0054248 A1 | * | 3/2004 | Kimchy et al. | 600/3 |

* cited by examiner

*Primary Examiner*—David Porta
*Assistant Examiner*—Faye Boosalis
(74) *Attorney, Agent, or Firm*—Scott A Felder; Earl H Baugher, Jr.

(57) ABSTRACT

A portable nuclear material detector generally includes a scintillating fiber radiation sensor, a light detector, a conditioning circuit, a frequency shift keying (FSK) circuit, a fast Fourier transform (FFT) circuit, an electronic controller, an amplitude spectral addition circuit, and an output device. A high voltage direct current (HVDC) source is provided to excite the light detector, while a separate power supply may be provided to power the remaining components. Portability is facilitated by locating the components of the detector within a handheld-sized housing. When bombarded by gamma particles, the radiation sensor emits light, which is detected by the light detector and converted into electrical signals. These electrical signals are then conditioned and converted to spectral lines. The frequency of a give spectral line is associated with a particular radioactive isotope, while the cumulative amplitude of all spectral lines having a common frequency is indicative of the strength and location of the isotope. All or part of this information (identity, strength, direction, and distance) may be provided on the output device.

16 Claims, 2 Drawing Sheets

PORTABLE NUCLEAR DETECTOR

STATEMENT REGARDING FEDERALLY SPONSORED RESEARCH OR DEVELOPMENT

The invention described herein may be manufactured and used by or for the United States Government for governmental purposes without the payment of any royalties thereon.

CROSS-REFERENCES TO RELATED APPLICATIONS

Not Applicable.

BACKGROUND OF THE INVENTION

1. Field of the Invention

The present invention relates generally to nuclear detection, and, more particularly, to a portable gamma radiation detector.

2. Background Description

Radioactive nuclear materials can be used to contaminate water supplies, business centers, government facilities, or transportation networks. They can cause physical disruption, interruption of economic activity, post-incident cleanup, and psychological trauma to a workforce and populace. In fact, the possibility of a radiological terrorist attack, often referred to as a "dirty bomb," is a fear that drives many anti-terrorism preparedness efforts. Accordingly, detection of nuclear materials prior to their use is desirable.

Several techniques exist for the detection, classification, and analysis of the spectra of nuclear materials. These include sodium-iodine detectors, high-purity germanium detectors, ionization chambers, energy-insensitive neutron detectors, and mass spectrographs. These techniques all use the same method of spectral analysis for the purpose of identifying and classifying nuclear radiation. This method is not immune to noise or clutter, thereby providing unsatisfactory output.

Mechanically, existing radioactive material detectors are large in size and extremely fragile, making them unsuitable for remote sensing and detecting applications, for example within the mass transit system of a major metropolitan area. Furthermore, extant systems require a long acquisition time for isotope identification and classification, and do not provide spatial directivity. This is undesirable from a rapid response or rapid reaction standpoint.

SUMMARY OF THE INVENTION

Accordingly, it is an object of the present invention to provide a fast, robust, and inexpensive technique for the detection and classification of nuclear material.

It is another object of the present invention to provide a nuclear material detector that is hand-portable.

It is still another object of the present invention to provide a nuclear material detector that possesses an excellent spectral resolution without a burdensome analysis process.

Yet another object of the present invention is to provide a nuclear material detector capable of localizing the presence of nuclear materials with high spatial directivity.

The present invention is a portable nuclear material detector including a scintillating fiber radiation sensor, preferably a scintillating fiber optical cavity sensor, a light detector in communication with the sensor, a conditioning circuit in communication with the conditioning circuit, a fast Fourier transform (FFT) circuit in communication with the FSK circuit, an electronic controller in communication with the electronic controller. An output device in bi-directional communication with the amplitude spectral addition circuit is also provided. Preferably, the scintillating fiber optical sensor is made up of several optical fibers embedded with a high-z crystal dopant, such as thallium-doped sodium iodide (NaI(Tl)) thallium-doped cesium iodide (CsI(Tl)). barium germinate (BGO), and barium fluoride ($BaF_2$). In embodiments, the light detector is a photo-multiplying tube (PMT), coupled to a high voltage direct current (HVDC) source for power. The conditioning circuit includes a pie-amplifier, an equalizer, and an amplifier. In order to facilitate portability of the detector, embodiments of the invention locate the components within a handheld-sized housing.

Light is emitted by the radiation sensor in response to impinging gamma particles. This light is detected by the light detector and converted into electrical signals. These electrical signals are then conditioned and converted to spectral lines. The frequency of a give spectral line is associated with a particular radioactive isotope, while the cumulative amplitude of all spectral lines having a common frequency is indicative of the strength and location of the isotope. All or part of this information (identity, strength, direction, and distance) may be output, for example on a liquid crystal display (LCD) that is part of a portable computer.

Further advantages of the present invention will be apparent from the description below with reference to the accompanying drawings, in which like numbers indicate like elements.

DETAILED DESCRIPTION OF PREFERRED EMBODIMENTS OF THE INVENTION

Figure 1:
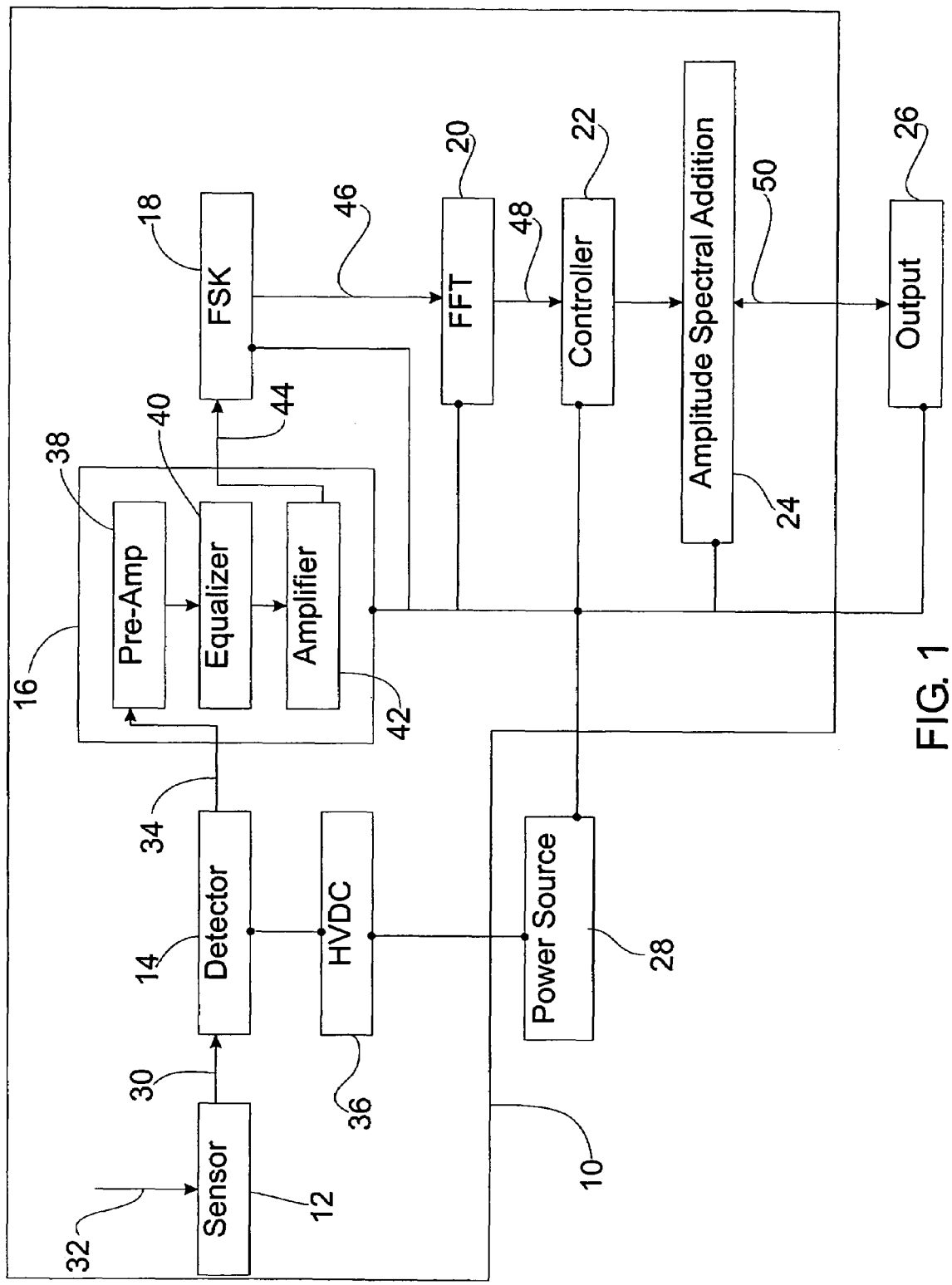
FIG. 1 is a block diagram of a nuclear material detector according to the present invention.

Referring now to the drawings, and especially to FIG. 1, there is shown a block diagram of a nuclear material detector 10 according to the present invention. Nuclear material detector 10 generally includes a scintillating fiber radiation sensor 12, a light detector 14 optically coupled to scintillating fiber radiation sensor 12, a conditioning circuit 16 in operable communication with light detector 14, a frequency shift keying (FSK) circuit 18 in operable communication with conditioning circuit 16, a fast Fourier transform (FFT) circuit 20 in operable communication with FSK circuit 18, an electronic controller 22 in operable communication with FFT circuit 20, and an amplitude spectral addition circuit 24 in operable communication with electronic controller 22. An output device 26 in bi-directional operable communication with amplitude spectral addition circuit 24 is also provided to provide output information from nuclear material detector 10. In embodiments, a power source 28 is included to power the electronic components of nuclear material detector 10. Power source 28 may be integrated with or external to nuclear material detector 10, and provides power to conditioning circuit 16, FSK circuit 18, FFT circuit 20, electronic controller 22, amplitude spectral addition circuit 24, and output device 26.

Scintillating fiber radiation 12 emits light 30 when bombarded and excited by gamma particles 32. Preferably, scintillating fiber radiation sensor 12 is a scintillating fiber optical cavity sensor formed from a plurality of optical fibers doped with one or more high-z crystals, such as NaI(Tl), CsI(Tl), BGO, and $BaF_2$. Scintillation light 30 is of constant wavelength, independent of radioactive isotope. However, the amplitude of light 30 will depend upon the particular radioactive isotope generating gamma particles 32.

Light detector 14 outputs an electrical signal 34 in response to detected and captured light 30. Electrical signal 34 corresponds to the amplitude of detected light 30. In the preferred embodiment of the invention, light detector 14 is a photo-multiplying tube (PMT). A high voltage direct current source 36 is operatively connected to and excites PMT 14.

Conditioning circuit 16 conditions electrical signal 34 for further processing. Conditioning circuit includes a pre-amplifier 38, an equalizer 40, and an amplifier 42. Pre-amplifier 38 is in operative communication with light detector 14, equalizer 40 is in operative communication with pre-amplifier 38, and amplifier 42 is in operative communication with equalizer 40. Pre-amplifier 38 and amplifier 42 amplify electrical signal 34, while equalizer 40 optimizes electrical signal 34. Conditioning circuit 16 then outputs a conditioned electrical signal 44.

Conditioned electrical signal 44 is input to FSK circuit 18. The output of FSK circuit 18 is a sinusoidal signal 46. The frequency of sinusoidal signal 46 is a function of the amplitude of conditioned electrical signal 44, which itself corresponds to the particular radioactive isotope being detected. Sinusoidal signal 46 is input to FFT circuit 20, which converts sinusoidal signal 46 from the time domain to the frequency domain, where the detected isotope is represented by one or more spectral lines 48.

Electronic controller 22 is programmed with a one-to-one table mapping the frequencies of spectral lines 48 to corresponding radioactive isotopes. Thus, it is possible to identify the radioactive isotope detected from the frequency of spectral lines 48. One skilled in the art will recognize that, during detection, many electrical signals 34 will be generated by light detector 14, and thus many spectral lines 48 will be output by FFT circuit 20. By summing spectral lines 48 having identical frequencies in amplitude spectral addition circuit 24, a cumulative spectral line 50 may be produced for each radioactive isotope detected. While the frequency of cumulative spectral line 50 indicates the identity of the isotope detected, the amplitude of cumulative spectral line 50 gives an indication of the relative strength, direction, and distance of a particular radioactive isotope. For example, let portable nuclear detector 10 be located at the center of a circle having radius r, and let the detected isotope be located at a point p on the circumference of the circle. The amplitude of cumulative spectral line 50 corresponding to the detected isotope will diminish as portable nuclear detector 10 is moved away from point p. That is, the amplitude of cumulative spectral line 50 is proportional to the radiation strength, and the direction of movement of portable nuclear detector 10 indicates the location of point p.

All, or part, of this information (identify, strength, direction, and distance) may be provided via output device 26. Preferably, output device 26 is a small (e.g., handheld, palmtop, or laptop) computer including a display, such as an LED or LCD, capable of graphically representing cumulative spectral lines 50 output by amplitude spectral addition circuit 24, thus providing a representation (correlated to electron-Volts) of the energy level of the detected isotope. However, other forms of output device 26, such as a printer or audible signal, are also contemplated.

Figure 2:
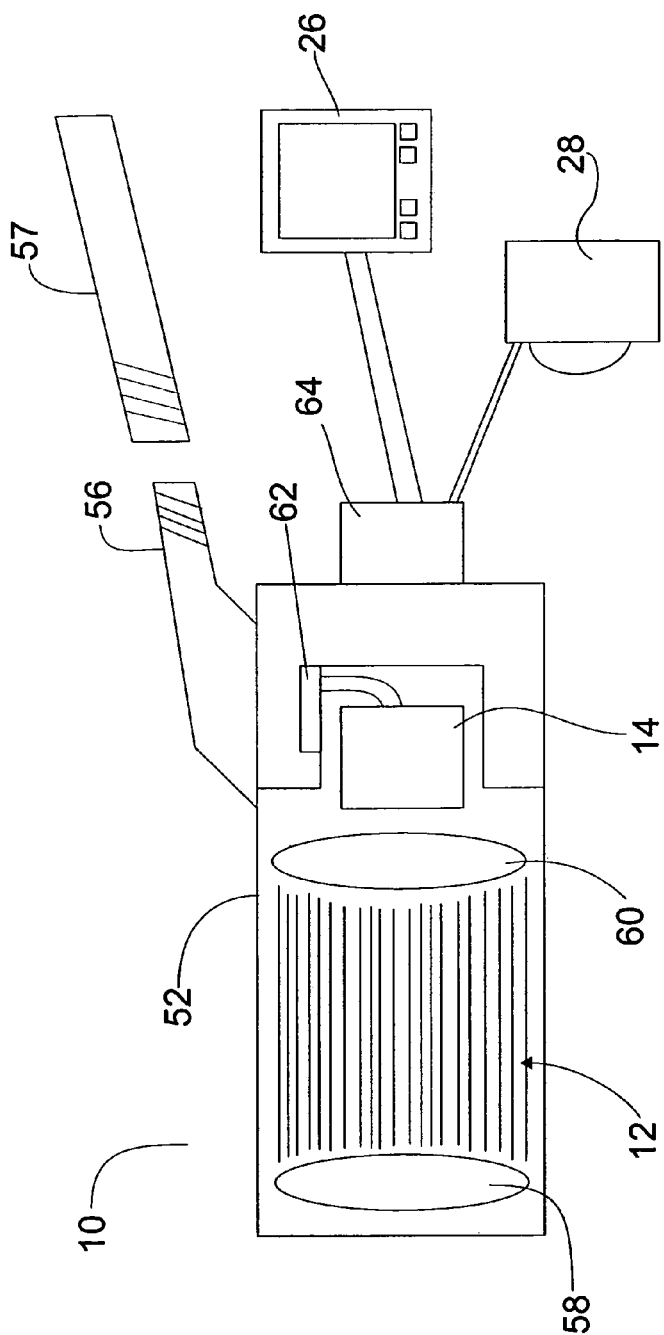
FIG. 2 is a cut-away side view of one embodiment of a portable nuclear material detector according to the present invention.

FIG. 2 depicts one embodiment of the nuclear material detector 10 of the present invention. A housing 52, which is optionally ruggedized, encloses the optical and electronic components of nuclear material detector 10. In the preferred embodiments of the invention, housing 52 is hand-portable, having dimensions of approximately thirty centimeters by thirty centimeters by fifteen centimeters. A handle 56 may also be provided on housing 52 to improve the portability of nuclear material detector 10. Handle 56 may be adapted for attachment of an extension 57, for example by providing external threads on handle 56 and corresponding internal threads on extension 57. Other methods of connecting handle 56 and extension 57, such as a friction fit, are contemplated as well.

Preferably, a 100% reflective lens 58 is provided towards the front of housing 52, while a 95%-98% reflective lens 60 is provided towards the rear of housing 52 in front of light detector 14. A printed circuit board (PCB) 62 incorporates one or more of conditioning circuit 16, FSK circuit 18, FFT circuit 20, controller 22, and amplitude spectral addition circuit 24. A connector 64 is provided on housing 52 to attach nuclear material detector 10 to output device 26, for example a handheld, palmtop, or laptop computer display, and power source 28. One skilled in the art will recognize that one or more of FSK circuit 18, FFT circuit 20, controller 22, and amplitude spectral addition circuit 24 may be incorporated into a small (e.g., palmtop) computer along with output device 26 rather than onto PCB 62. Similarly, one or both of output device 26 and power source 28 may be integrated with housing 52, as described above. The connection between nuclear material detector 10 and output device 26 may be wired or wireless. In embodiments, the operator may conveniently wear power supply 28 as a backpack.

In use, nuclear material detector 10 is brought into an environment where a particular radioactive isotope is emitting gamma particles. The gamma particles impinge upon the scintillating fibers in scintillating fiber sensor 12, causing the dopant in the scintillating fibers to throw off photons and emit light of a specified wavelength, but at an isotope-dependent amplitude. The light is harnessed by the scintillating fibers and captured by light detector 14, which converts the captured light into corresponding electrical pulses. Pre-amplifier 38 amplifies the electrical pulse, which is then reshaped by equalizer 40, and amplified again by amplifier 42. The amplified and optimized electrical pulse is input to FSK circuit 18, which converts the input pulse to a sinusoidal signal. The frequency of the sinusoidal signal is a function of the amplitude of the amplified and optimized electrical pulse, and therefore is a function of the detected isotope. FFT circuit 20 transforms the sinusoidal signal from the time domain to the frequency domain, such that the detected isotope is represented by a spectral line of a particular frequency. The spectral line is matched to a radioactive isotope in controller 22, while amplitude spectral addition circuit 24 sums all spectral lines of the same frequency (that is, from the same isotope), to determine the energy level of the detected isotope. The operator can then read the information provided by output device 26.

While the invention has been described in terms of its preferred embodiments, those skilled in the art will recognize that the invention can be practiced with modifications within the spirit and scope of the appended claims. Thus, it is intended that all matter contained in the foregoing description or shown in the accompanying drawings shall be interpreted as illustrative rather than limiting, and the invention should be defined only in accordance with the following claims and their equivalents.

What is claimed is:

1. A nuclear material detector, comprising:
   a scintillating fiber radiation sensor, said scintillating fiber radiation sensor emitting light when bombarded by gamma particles;
   a light detector optically coupled to said scintillating fiber radiation sensor,
   wherein said light detector detects light emitted by said scintillating fiber radiation sensor and outputs corresponding electrical signals;
   a conditioning circuit in operable communication with said light detector, wherein said conditioning circuit conditions the electrical signals output by said light detector for further processing;
   a frequency shift keying (FSK) circuit in operable communication with said conditioning circuit, wherein said FSK circuit converts the conditioned electrical signals output by said conditioning circuit into corresponding sinusoidal signals;
   a fast Fourier transform (FFT) circuit in operable communication with said FSK circuit, wherein said FFT circuit converts the sinusoidal signals into corresponding spectral lines;
   an electronic controller in operable communication with said FFT circuit, wherein said electronic controller is programmed with a table mapping frequencies of the spectral lines to corresponding radioactive isotopes; and
   an amplitude spectral addition circuit in operable communication with said electronic controller,
   wherein said amplitude spectral addition circuit sums the spectral lines output by said FFT circuit having equivalent frequencies, thereby producing a cumulative spectral line for each radioactive isotope detected.

2. The nuclear material detector according to claim 1, wherein said light detector is a photo-multiplying tube (PMT), further comprising a high voltage direct current (HVDC) source,
   wherein said HVDC source is operatively connected to and excites said PMT.

3. The nuclear material detector according to claim 1, wherein said scintillating fiber radiation sensor comprises a scintillating fiber optical cavity sensor.

4. The nuclear material detector according to claim 3, wherein said scintillating fiber optical cavity sensor comprises a plurality of optical fibers, said plurality of optical fibers embedded with a high-z crystal dopant.

5. The nuclear material detector according to claim 4, wherein said high-z crystal dopant is selected from the group consisting of: NaI(Tl), CsI(Tl), BGO, $BaF_2$, and any combination thereof.

6. The nuclear material detector according to claim 1, wherein said conditioning circuit comprises:

a pre-amplifier in operative communication with said light detector;
an equalizer in operative communication with said pre-amplifier; and
an amplifier in operative communication with said equalizer.

7. The nuclear material detector according to claim 1, further comprising a power supply.

8. The nuclear material detector according to claim 1, further comprising an output device in operable communication with said amplitude spectral addition circuit.

9. The nuclear material detector according to claim 8, wherein said output device comprises a portable computer including a display.

10. The nuclear material detector according to claim 8, wherein said output device graphically represents the cumulative spectral lines output by said amplitude spectral addition circuit.

11. The nuclear material detector according to claim 8, wherein said output device provides information concerning at least one of an identity of a detected radioactive isotope, a distance to the detected radioactive isotope, a direction of the detected radioactive isotope, and a strength of the detected radioactive isotope.

12. The nuclear material detector according to claim 1, wherein amplitude of the light emitted by said scintillating fiber radiation sensor is isotope-dependent and isotope-specific.

13. The nuclear material detector according to claim 1, further comprising a housing enclosing said scintillating fiber radiation sensor, said light detector, said conditioning circuit, said FSK circuit, said FFT circuit, said electronic controller, and said amplitude spectral addition circuit.

14. The nuclear material detector according to claim 13, wherein said housing is ruggedized.

15. The nuclear material detector according to claim 13, wherein said housing is hand-portable.

16. A method of detecting and identifying nuclear materials, comprising the steps of:
   providing a scintillating fiber radiation sensor that emits light when bombarded by gamma particles;
   capturing the light emitted by the scintillating fiber radiation sensor;
   converting the light emitted by the scintillating fiber radiation sensor into electrical signals;
   converting the electrical signals to spectral lines;
   associating frequencies of the spectral lines with detected radioactive isotopes;
   determining respective cumulative energy levels of the detected radioactive isotopes; and
   outputting information regarding the detected radioactive isotopes and their respective cumulative energy levels.

* * * * *